E. GREEN.
AUTOMATIC CHAIN TONGS.
APPLICATION FILED MAR. 11, 1913.
1,071,908.
Patented Sept. 2, 1913.
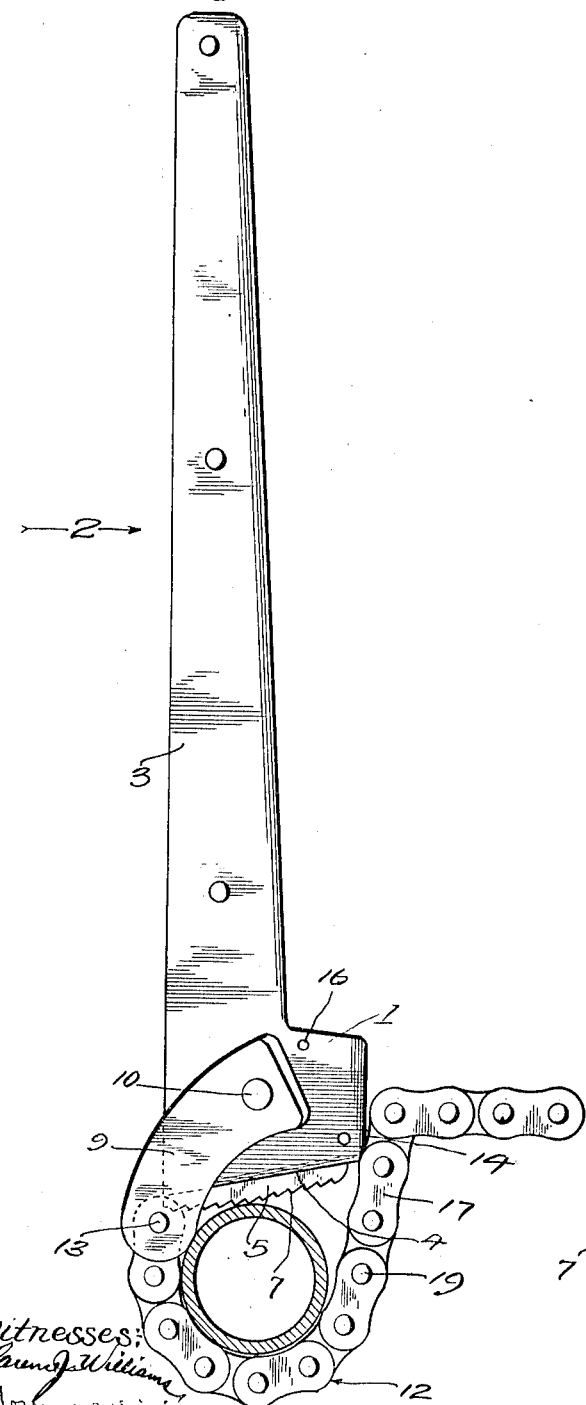
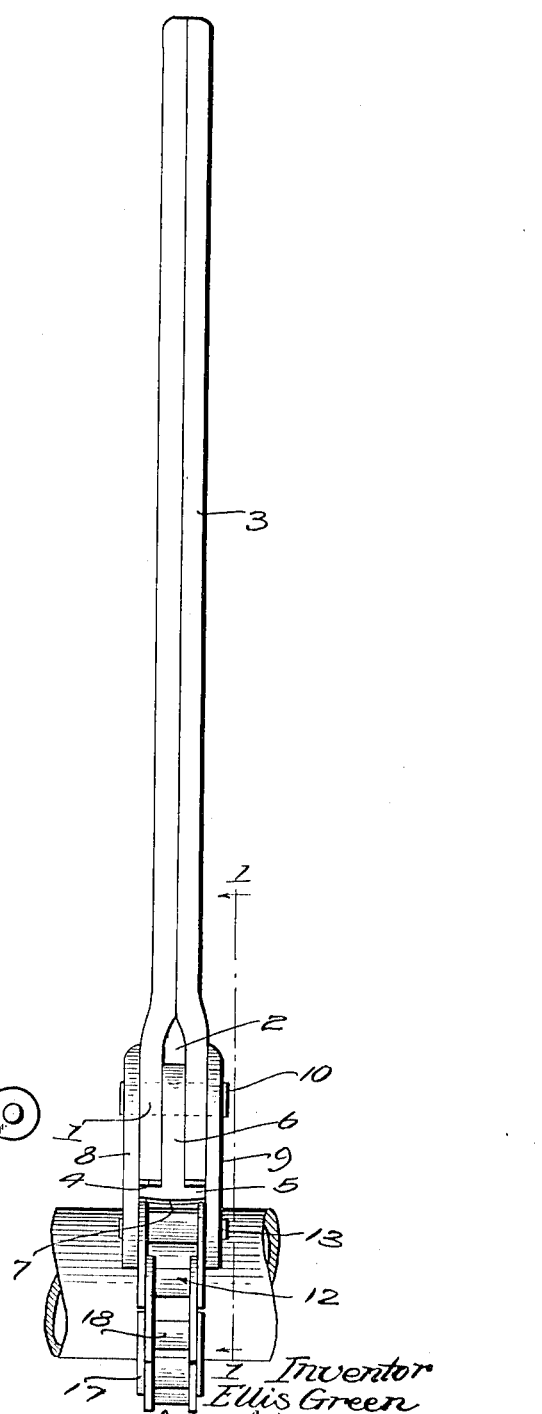

E. GREEN.
AUTOMATIC CHAIN TONGS.
APPLICATION FILED MAR. 11, 1913.
1,071,908.
Patented Sept. 2, 1913.
2 SHEETS—SHEET 2.
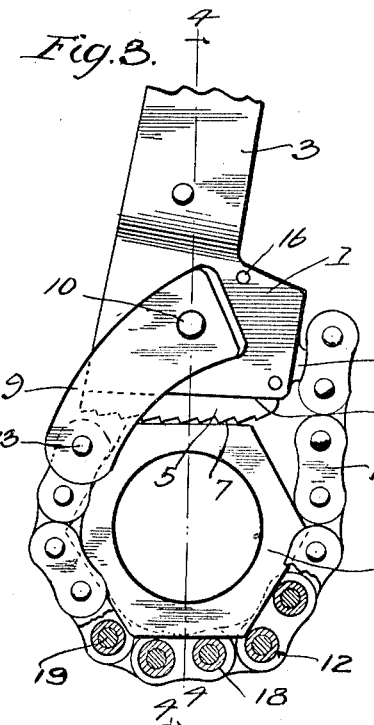
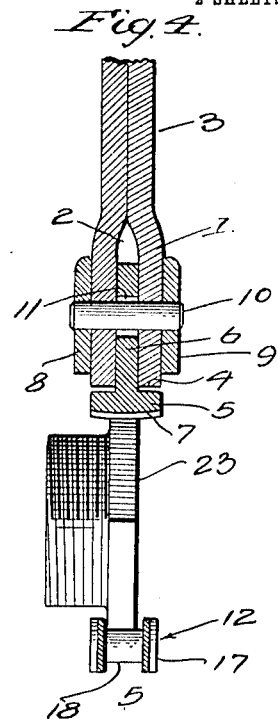
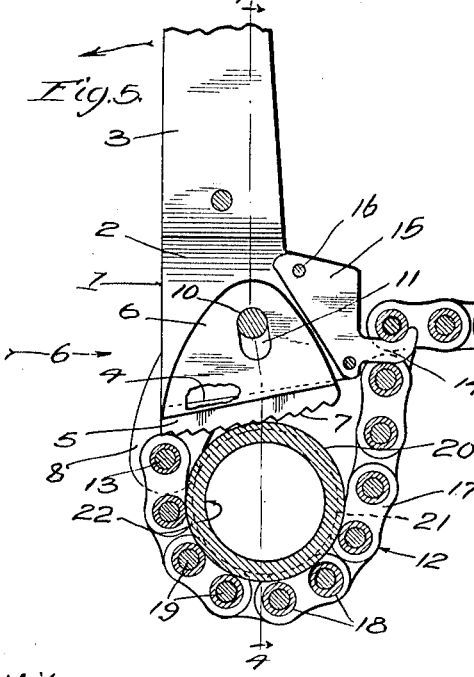
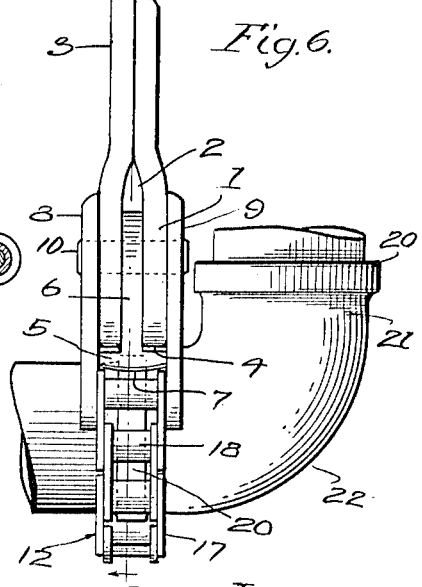
Witnesses:
Inventor
Ellis Green
by Semer G. Wells,
his Attorney

UNITED STATES PATENT OFFICE.

ELLIS GREEN, OF LOS ANGELES, CALIFORNIA, ASSIGNOR OF ONE-HALF TO THEODORE F. WORTH, OF LOS ANGELES, CALIFORNIA.

AUTOMATIC CHAIN TONGS.

1,071,908.  Specification of Letters Patent.  Patented Sept. 2, 1913.

Application filed March 11, 1913. Serial No. 753,525.

*To all whom it may concern:*

Be it known that I, ELLIS GREEN, a citizen of the United States, residing at Los Angeles, county of Los Angeles, State of California, have invented a new and useful Automatic Chain Tongs, of which the following is a specification.

My object is to make a pipe tongs which will follow the bead or rim of an elbow, T, bushing or the like, around and around, and not be obstructed by the outlet of a T or the like; and my invention consists of the novel features herein shown, described and claimed.

In the drawings: Figure 1 is a side elevation of a pipe tongs embodying the principles of my invention, in operation, the pipe being shown in section, as indicated by the line 1—1 in Fig. 2. Fig. 2 is an edge view as indicated by the arrow 2 in Fig. 1. Fig. 3 is a view analogous to Fig. 1 and showing the operation on a bushing instead of a pipe. Fig. 4 is a sectional detail on the line 4—4 of Fig. 3. Fig. 5 is a sectional detail on a plane parallel with Figs. 1 and 3 and taken on the line 5—5 of Fig. 6, and showing the operation on a beaded fitting. Fig. 6 is an edge view as seen looking in the direction of the arrow 6 in Fig. 5.

Referring to the drawing in detail, the head 1 is bifurcated to form the housing slot 2. The handle 3 extends from the head 1. The bearing face 4 of the head is on the opposite side from the handle 3 and is slightly inclined downwardly from the back to the front relative to a horizontal plane when the handle is in a vertical plane. The toothed gripping plate 5 fits against the bearing face 4 and has a supporting shank 6 fitting in the housing slot 2. The toothed face 7 of the gripping plate is slightly curved longitudinally. The curved clevis links 8 and 9 fit on opposite sides of the head 1 and the pivot pin 10 extends through the links 8 and 9, the head 1, and the shank 6. The opening 11 through the shank 6 is elongated up and down so as to allow the gripping plate 5 some looseness relative to the head 1. The chain 12 is placed between the ends of the clevis links 8 and 9 and secured by a pin 13. The chain 12 is in line with the gripping plate 5. The hook 14 has a head 15 secured in the housing slot 2 by rivets 16, said hook also being in line with the gripping plate 5.

The chain 12 consists of plate links 17 spaced apart by rollers 18 and secured together by pins 19, the rollers 18 being smaller in diameter than the width of the links so that the bead 20 or rim 21 of a fitting 22 or bushing 23 will fit between the two rows of links.

The chain 12 is passed around the pipe or fitting and placed upon the hook 14 and the tongs operated in the usual way. There is a great advantage in making the chain and gripping plate in line so that the chain may ride around and around upon the rim of a fitting and in making the head narrow so it will pass the outlet of the T or the like.

The details of construction may be varied in many ways without departing from the spirit of my invention as set up in the following claim.

There is a great advantage in having the gripping plate on the end face crosswise of the handle, because work can be done in many places where other tongs cannot be used. There is no pipe fitting made, except the return bend, upon which my tongs will not go around and around. When work is being done where the bead or rim is horizontal the tongs will not fall from its place. When the chain is hooked it cannot fall off.

Especial attention is called to the gripping plate 5 loosely mounted against the end bearing face 4. This looseness is of great importance in letting go, or locking up, or unlocking. The strain of the gripping plate 5 is never on the pivot 10.

I claim:

Pipe tongs comprising a head bifurcated to form a housing slot; a handle extending one way from the head, there being a slightly inclined bearing face at the opposite side of the head from the handle; a toothed gripping plate fitting against the bearing face; a supporting shank extending from the gripping plate and fitting in the housing slot; the tooth face of the gripping plate being slightly curved longitudinally; curved clevis links fitting on opposite sides of the head; a pivot connecting the links to the head, said pivots extending through the links, the head and the shank; the opening through the shank being elongated up and down so as to allow the gripping plate some looseness relative to the head; a chain connected between the ends of the curved clevis links; and a hook projecting laterally from the head.

ELLIS GREEN.

Witnesses:
A. L. McKEETH,
SEMER G. WELLS.

Copies of this patent may be obtained for five cents each, by addressing the "Commissioner of Patents, Washington, D. C."